Patented Oct. 29, 1940

2,219,581

UNITED STATES PATENT OFFICE 2,219,581

DECOLORIZING AND FILTERING AGENT

Richard W. Schmidt, Redondo Beach, Calif., assignor to The Dicalite Company, Los Angeles, Calif., a corporation of Delaware No Drawing. Application April 4, 1938,
Serial No. 200,057

4 Claims. (Cl. 252—2)

An object of the invention is to provide a new and valuable filtering agent or filter-aid having marked decolorizing properties for sugar solutions and other liquids.

An object of the invention is to provide a method by which an agent having, in combination, marked decolorizing properties, a high flow rate and excellent clarifying power, may be produced in large quantity at a low cost.

The product of the invention may briefly be described as comminuted diatomaceous earth having its constituent particles, or a material proportion thereof, coated with active decolorizing carbon.

A product of this general description may be made in various ways, as for example by carbonizing organic matter in contact with diatomaceous earth, by depositing on the diatoms the carbon produced by the thermal decomposition of hydrocarbon gases and vapors, and by depositing on the diatoms free carbon in the form of soot derived from contact with a smoky flame.

The method herein described, however, is that in which a previously formed and comminuted carbon is attached to the surfaces of the diatoms by an adhesive agent which itself is capable of carbonization, the mass then being submitted to a heating step by which the adhesive is converted into carbon without destroying its property of retaining the original carbon particles in attachment to the surfaces of the diatoms.

It is known to at least some workers in the sugar industry that some of the free carbons used as black pigments (e. g., carbon black, lamp black, etc.) have a relatively high decolorizing value when applied to sugar solutions. As these substances are absolutely inert chemically, and as they have no structure, their value as adsorbents for the colored bodies of the solution appears to be due to their extreme state of subdivision, which approaches colloidal dimensions. This extreme subdivision has, up to this time, deprived them of any practical usefulness as decolorizing agents, for the reason that, once added to and mixed with the solution to be bleached, they cannot thereafter be completely removed, the closest filters and even a precoat of the best filter-aids passing enough of the fine carbon particles to destroy the usefulness of the bleached solution. Further, these fine particles rapidly choke the pores of the filtering medium, whatever it may be, so that the flow rate is almost a disappearing quantity.

It is also well known that the decolorizing value of the bleaching carbons formed by carbonizing animal and vegetable matter, coals, etc., is much enhanced by fine grinding, that in the fineness to which they are commercially ground they are difficult to filter from the bleached solution, and that the degree of fineness which develops their ultimate decolorizing value renders them useless by rendering them substantially or completely nonfilterable.

Both of these groups of finely divided carbons, and particularly the soot carbons, would be highly valuable as decolorizing agents if any way could be found to overcome their tendency to clog the filtering medium or to pass through it into the filtrate. The addition of even the best filter-aids, such as are efficacious when used with the coarser commercial carbons, do not suffice for this purpose unless used in doses which are wholly extravagant and impracticable.

In the course of many attempts to impart filterability to these finely subdivided carbons I tried repeatedly to cement the carbon particles to the surfaces of the diatoms of which a diatomaceous earth filter-aid is composed, hoping thereby to retain the carbon particles in a porous mass through which the liquid would pass freely and without contamination. These attempts were unsuccessful. When water-soluble adhesives were used the addition of the composite mass to an aqueous liquid to be filtered caused the adhesive to be redissolved and destroyed the adhesion, while insoluble adhesives such as resins and bitumens greatly depreciated or entirely destroyed the original decolorizing value of the carbon.

The problem was finally solved and the desired result obtained by using an organic adhesive which could be reduced to the liquid condition and spread on the surfaces of the diatoms and which, by reason of its organic nature, is itself capable of carbonization. By cementing the carbon particles to the diatoms with an adhesive of this character and then submitting the cemented mass to a heating step sufficient to decompose and carbonize the adhesive, it was found to be possible to destroy the solubility (if any) of the adhesive in water while maintaining the attachment of the carbon particles to the diatoms, and to restore the original decolorizing value of the carbon particles. The product of these steps was found to have a decolorizing value at least equal to that of the quantity and kind of carbon used in its manufacture, together with a high flow rate yielding a crystal clear filtrate when applied in doses commercially practicable and customary.

These discoveries I have reduced to practice in the following manner. I first prepare a diatomaceous earth filter-aid, selecting an earth consisting to the largest possible extent of unbroken diatom structures and comminuting it to the required fineness with the least possible degradation of the structure. This filter-aid may be a raw earth or it may be calcined, either with or without a flux. The manufacture of filter-aids from diatomaceous earth is a well known art and needs no further description for the present purpose, it being sufficient to say that the best filter-aid will, other things being equal, yield the best final product.

I next select a carbon which has suitable decolorizing properties or which is capable of developing such properties when subjected to the partial slow combustion ordinarily referred to as activation. This raw material may be already activated, as in cases where the process is designed to utilize the most finely divided fractions from the manufacture of commercial carbons or such materials as carbon black which are usually rendered active in the process of their manufacture. If the carbon which is available or which it is desired to use has not already been activated it is usually undesirable to activate it in advance, in view of the fact that it may be necessary to activate the product after cementation and carbonization. The carbon taken for this purpose may be a hardwood or softwood charcoal ground to a state of extreme fineness, or a lampblack or carbon black which is inherently finely subdivided. There would be no particular purpose in applying the present process to a carbon of such degree of coarseness as to be free filtering, though it is often the case that it is profitable to grind such carbons to a nonfilterable fineness, for the resulting increase in their decolorizing value, and then to aggregate them in the manner of the present invention in order to restore filterability. The principal object of the process, however, is to permit the utilization of the soot carbons or other materials which have decolorizing properties or possibilities but which are useless or difficult to use because of their lack of filterability.

I finally prepare a solution (usually aqueous) of an organic substance having adhesive properties. A wide range of substances is available, as for example casein glue, fish glue, gum arabic, gum karaya and dextrin. It is also possible to use gums and resins soluble in alcohols or other organic solvents, though there appears to be no advantage in using these more expensive materials. It is also possible, and sometimes advantageous, to use fusible gums or resins by heating the powdered materials to the melting point of the organic substance. Inorganic adhesives, as for example sodium silicate, cannot be used, as the film of such adhesive is not destroyed in the heating step and remains to reduce the decolorizing value of the product.

The filter-aid, the carbon and the adhesive are now thoroughly mixed and blended, the solution of adhesive containing enough water to at least dampen the mixture so as to permit the thorough distribution of the adhesive over the diatom surfaces. Addition of the adhesive to the filter-aid prior to the addition of the carbon will permit the use of a smaller amount of the adhesive, but may make the thorough blending in of the carbon slower and more difficult. The mixture should not be permitted to dry out during blending but should be maintained in a moist or pasty condition until the three ingredients are completely and evenly intermixed.

The proportions in which the three constituents of the mixture are taken will be governed by the balance of properties required in the finished product as well as by the nature of the carbon. The decolorizing value increases and the filtering and clarifying values decrease as the proportion of any given carbon to the filter-aid constituent is increased. As a rule the same effect is observed in substituting the bulky soot carbons for the denser chars. It is desirable (though this desideratum is seldom attained completely) that all of the carbon particles be attached directly to filter-aid particles rather than to each other, and for that reason the soot carbons are preferably used in smaller proportions than the chars. This end is also promoted by mixing the adhesive with the filter-aid prior to adding the carbon.

On microscopic examination of the material at this stage of the process the diatoms will be seen to have large numbers of carbon particles attached to them, while usually some aggregates of carbon particles will also be evident. The attachment of carbon particles to earth is not yet permanent, the adhesive being (in most cases) water soluble and subject to removal by the aqueous liquids to be filtered.

I therefore proceed, as the next step, to render the attachment permanent by heating the mixture, entirely out of contact with the atmosphere, to such temperature as to carbonize the adhesive agent. The final temperature should be such as to complete the destructive distillation of the adhesive, leaving a residue of carbon which acts to bind the admixed carbon particles to the earth particles.

The heating step may be carried out in any preferred manner, continuously or intermittently, in a fixed or rotating kiln, in a tunnel or on a hearth. If the heating is performed by direct firing a reducing atmosphere should be maintained. It is desirable to keep the mixture in motion until it is thoroughly dried out in order to reduce the tendency toward agglomeration into masses.

At the end of the carbonization stage the material consists of diatomaceous earth with carbon firmly bonded to the diatoms, but as a rule will show a rather low decolorizing value, even though the carbon taken for the mixture was of the active variety. As a rule the decolorizing value at this stage is reduced as the proportion of adhesive in the mixture is increased. Apparently the carbonization of the adhesive forms a thin glaze of dense and relatively inactive carbon over the surfaces of the original carbon particles and thus excludes them from effective contact with the liquid to which the product is applied.

In case the decolorizing value of the carbonized product proves to be too low, the next step will be to impart porosity to this glaze and thus to permit the original carbon (if active) to resume its activity, or to bring a previously unactivated carbon to the active form. This step consists in exposing the carbonized product, at a temperature ranging from 1000° Fahr. upwardly, to contact with a mild gaseous oxidizing agent such as carbon dioxide, combustion gases which contain no more than a minute quantity of free oxygen, or preferably superheated steam. This contact is continued until the decolorizing value no longer increases, a period which must be determined by trial with each change of conditions, as it varies over a wide range with the nature and condition of the original carbon, the size of the mass, the nature of the activating agent and the temperature at which the contact is effected. Overactivation must be avoided as the quantity of bonding carbon is small and spread out over a wide area, and the destruction of this bond will destroy the filterability of the product. The material should constantly be agitated during the treatment to expose all portions of the mass equally to contact with the steam or other gas and, when activation is completed, the mass must be cooled to a temperature below the ignition point before the product is exposed to contact with air.

The product of this operation is a dry black powder which may be of the original fineness of the filter-aid or may be somewhat coarser due to aggregation. In the latter case it should be subjected to a gentle milling to bring it back to filter-aid fineness.

The following example will illustrate the working of the process, the quantities taken being purely suggestive and not to be considered as limiting. To ten parts by weight of a finely comminuted diatomaceous earth filter-aid I added one part by weight of fish glue dissolved in sufficient water to produce a thick pulp when the solution was incorporated with the earth. This mixture was then blended by stirring with ten parts of commercial carbon black in a state of extreme subdivision. When completely equalized by continued stirring the mixture had attained a semi-dry consistency and was capable of being squeezed into coherent lumps.

The mixture was then charged into a substantially closed retort in which it was heated at a gradually rising temperature until steam and vapor ceased to be evolved. The temperature was then raised to 1650° Fahr. and the carbonized product was treated with a stream of steam for one-half hour, maintaining the temperature. The mass was then cooled, withdrawn from the retort, and lightly milled to break down some aggregates and to return the product to the original fineness of the filter-aid used.

The relations, as to quantities and properties, between the materials taken and the product of the operation, were as follows:

Diatomaceous earth filter-
  aid _____ 10 parts
Carbon black _____ 10 parts
Glue (dry form) _____ 1 part    21 parts
Product yield _____ 20 parts
Loss in processing _____ 1 part    21 parts Filter-aid:
  Decolorizing value _____ None
  Flow rate _____ 100%
  Clarity of filtrate _____ Perfect Carbon black:
  Decolorizing value _____ 97 units
  Flow rate _____ Very low
  Clarity of filtrate _____ Poor Glue:
  Decolorizing value _____ None Product:
  Decolorizing value (before steaming) _____ 20 units
  Decolorizing value (after steaming) _____ 45 units
  Flow rate _____ 100%
  Clarity of filtrate _____ Perfect It will be seen that in this instance the decolorizing value of the activated (steamed) product was substantially equal to that of the quantity of carbon black which it contained, this black having previously been brought to a high decolorizing value by an extreme subdivision which exposed large surfaces to contact with the sugar solution to be decolorized. This carbon, however, was wholly useless in its original state, the degree of subdivision to which its decolorizing power is due having rendered it nonfilterable, even with the addition of filter-aids.

The treatment above described imparted a high flow rate and made it possible to obtain a crystal clear filtrate without reducing the decolorizing value, thereby imparting commercial usefulness, as a combined decolorizing and filtering agent, to a material otherwise useless for that purpose.

I claim as my invention:

1. The method of producing a decolorizing and filtering agent which comprises: coating the particles of a finely divided diatomaceous earth filter-aid with a carbonizable organic adhesive; cementing minute preformed particles of a finely comminuted carbon selected from the group consisting of the vegetable chars and the soot carbons to the surfaces of said earth particles by means of said adhesive coatings; subjecting the mixture to a step of carbonization, and activating the carbon contained in the carbonized mixture by contact at elevated temperature with a mild gaseous oxidizing agent.

2. The method of preparing a filtering agent having decolorizing properties which comprises, mixing a finely divided activated carbon with a finely divided diatomaceous earth filter-aid and an aqueous solution of an organic adhesive, said solution containing enough water to permit the thorough distribution of the adhesive over the diatom surfaces, drying and carbonizing the mixture and returning the product to filter-aid fineness.

3. The method of preparing a filtering agent having decolorizing properties which comprises, mixing a finely divided activated carbon selected from the class consisting of the vegetable chars and the soot carbons with a finely divided diatomaceous earth filter-aid and an aqueous solution of an organic adhesive, said solution containing enough water to permit the thorough distribution of the adhesive over the diatom surfaces, drying and carbonizing the mixture and returning the product to filter-aid fineness.

4. The method of preparing a filtering agent having decolorizing properties which comprises, coating a finely divided diatomaceous earth filter-aid with an aqueous solution of an organic adhesive, said solution containing enough water to permit the thorough distribution of the adhesive over the diatom surfaces, thereafter mixing in a finely divided activated carbon, heating the mixture to carbonize the adhesive and returning the product to filter-aid fineness.

RICHARD W. SCHMIDT.